(12) United States Patent
Choi

(10) Patent No.: US 10,167,821 B2
(45) Date of Patent: Jan. 1, 2019

(54) ENGINE SYSTEM HAVING EXHAUST GAS RECIRCULATION APPARATUS AND METHOD OF CONTROLLING THE ENGINE SYSTEM HAVING EXHAUST GAS RECIRCULATION APPARATUS

(71) Applicant: HYUNDAI MOTOR COMPANY, Seoul (KR)

(72) Inventor: Choo Saeng Choi, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 103 days.

(21) Appl. No.: 15/286,958

(22) Filed: Oct. 6, 2016

(65) Prior Publication Data
US 2017/0356397 A1 Dec. 14, 2017

(30) Foreign Application Priority Data
Jun. 10, 2016 (KR) .......................... 10-2016-0072548

(51) Int. Cl.
*F02M 26/06* (2016.01)
*F02M 35/10* (2006.01)
(Continued)

(52) U.S. Cl.
CPC ............ *F02M 26/06* (2016.02); *F02B 37/186* (2013.01); *F02M 26/23* (2016.02); *F02M 35/10222* (2013.01); *Y02T 10/144* (2013.01)

(58) Field of Classification Search
CPC .. F02M 26/06; F02M 35/10222; F02M 26/23; F02B 37/186
(Continued)

(56) References Cited

U.S. PATENT DOCUMENTS 6,564,784 B1 * 5/2003 Onodera ................. F02B 37/16
123/568.12
9,581,079 B2 * 2/2017 Jin ......................... F02B 37/183
(Continued)

FOREIGN PATENT DOCUMENTS

EP 0964993 B1 12/1999
JP 2011-190744 A 9/2011
(Continued)

*Primary Examiner* — Hoang Nguyen
(74) *Attorney, Agent, or Firm* — McDermott Will & Emery LLP

(57) ABSTRACT

An engine system having an exhaust gas recirculation apparatus, the engine system including an engine including a plurality of combustion chambers that generates a driving power by combusting fuel, an intake line into which intake gas to be supplied into the combustion chamber flows, an exhaust line through which exhaust gas discharged from the combustion chamber flows, a turbocharger including a turbine provided in the exhaust line and rotated by exhaust gas discharged from the combustion chamber, and a compressor provided in the intake line and rotated in conjunction with the rotation of the turbine and compressing outside air, an EGR apparatus including an EGR line that branches off from the exhaust line at a rear end of the turbocharger and merges into the intake line, and an EGR cooler disposed in the EGR line for cooling exhaust gas flowing through the EGR line, a waste gate valve installed in an exhaust bypass line, which branches off from a front end of the turbine and merges into a rear end of the turbine, and adjusts an amount of exhaust gas flowing into the turbine, and a recirculation valve installed in an intake bypass line, which branches off the intake line at a front end of the engine and merges into the intake line at a front end of the compressor, and supplies a part of the intake gas, which is compressed by the turbocharger, into the intake line at the front end of the compressor.

2 Claims, 6 Drawing Sheets

(51) Int. Cl.
*F02B 37/18* (2006.01)
*F02M 26/23* (2016.01)

(58) Field of Classification Search
USPC .................. 60/600, 602, 605.1, 605.2, 611
See application file for complete search history.

(56) References Cited

U.S. PATENT DOCUMENTS

| | | | | |
|---|---|---|---|---|
| 2012/0304640 | A1* | 12/2012 | Tsuyuki | F02D 21/08 60/605.2 |
| 2015/0068204 | A1* | 3/2015 | Han | F02B 33/446 60/605.2 |
| 2015/0184603 | A1* | 7/2015 | Han | F02B 37/183 60/600 |
| 2016/0047339 | A1* | 2/2016 | Kuze | F02D 41/3076 60/600 |

FOREIGN PATENT DOCUMENTS

| | | |
|---|---|---|
| KR | 10-1198811 B1 | 11/2012 |
| KR | 10-20140024281 A | 2/2014 |
| KR | 10-2015-0100347 A | 9/2015 |

* cited by examiner

· Waste gate valve
adjusted based on desired boost pressure

· Waste gate valve
Opened by preset amount or more

ENGINE SYSTEM HAVING EXHAUST GAS RECIRCULATION APPARATUS AND METHOD OF CONTROLLING THE ENGINE SYSTEM HAVING EXHAUST GAS RECIRCULATION APPARATUS

CROSS-REFERENCE TO RELATED APPLICATION

This application claims the benefit of priority to Korean Patent Application No. 10-2016-0072548, filed with the Korean Intellectual Property Office on Jun. 10, 2016, the entire contents of which are incorporated herein by reference.

TECHNICAL FIELD

The present disclosure relates to an engine system having an exhaust gas recirculation apparatus and a method of controlling the engine system having an exhaust gas recirculation apparatus, and more particularly, to an engine system having an exhaust gas recirculation apparatus and a method of controlling the same which are capable of increasing an exhaust gas recirculation ratio.

BACKGROUND

An engine for an automobile generates power by mixing fuel with air introduced from the outside at an appropriate ratio and combusting the mixture.

In order to obtain a desired output and combustion efficiency, it is necessary to supply a sufficient amount of outside air for combustion during a process of generating power by operating the engine. To this end, a turbocharger is used as an apparatus that supercharges the engine with air for combustion in order to improve a combustion efficiency of the engine.

In general, the turbocharger is an apparatus that increases output of the engine by rotating a turbine by using pressure of exhaust gas discharged from the engine and then supplying high-pressure air into a combustion chamber by using a rotational force of the turbine. The turbocharger is applied to most diesel engines, and recently, the turbocharger is also applied to gasoline engines.

In addition, nitrogen oxide (NOx) included in exhaust gas is considered an air pollutant, and research is being conducted to reduce emissions of NOx.

An exhaust gas recirculation (EGR) system is a system mounted in a vehicle in order to reduce various exhaust gas particles. In general, NOx increases in a case in which a proportion of air in the gaseous mixture is large and thus combustion is smoothly carried out. Therefore, the exhaust gas recirculation system is a system that mixes a part (e.g., 5 to 20%) of exhaust gas discharged from the engine with the gaseous mixture again so as to reduce the amount of oxygen in the gaseous mixture and hinder the combustion, thereby inhibiting generation of NOx.

An exhaust gas recirculation (EGR) system for a gasoline engine is mounted in the vehicle in order to improve fuel economy. With the exhaust gas recirculation (EGR) system, it is possible to improve fuel economy by advancing the ignition timing by reducing a pumping loss within a low-speed/low-load region and reducing a temperature in the combustion chamber within a medium-speed/medium-load region.

In a given exhaust gas recirculation system, there is a low pressure exhaust gas recirculation (LP-EGR) apparatus. The LP-EGR apparatus recirculates exhaust gas which has passed through the turbine of the turbocharger into an intake passageway at a front end of a compressor.

In the case of the exhaust gas recirculation system in the related art, recirculation gas is supplied to the combustion chamber of the engine by a rotational force of the turbine and the compressor while the turbocharger operates.

However, when the turbocharger does not operate, negative pressure may be generated at the front end of the compressor, and as a result, a separate differential pressure generating valve is used. However, in a case in which the differential pressure generating valve is mounted as described above, there is a problem in that manufacturing costs of the vehicle are increased.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an engine system having an exhaust gas recirculation apparatus and a method of controlling the same which are capable of increasing an EGR ratio without using a separate differential pressure generating valve.

An exemplary embodiment of the present disclosure provides an engine system having an exhaust gas recirculation apparatus, the engine system including: an engine which includes a plurality of combustion chambers that generates driving power by combusting fuel; an intake line into which intake gas to be supplied into the combustion chamber flows; an exhaust line through which exhaust gas discharged from the combustion chamber flows; a turbocharger which includes a turbine that is provided in the exhaust line and rotated by exhaust gas discharged from the combustion chamber, and a compressor that is provided in the intake line and rotated in conjunction with the rotation of the turbine and compresses outside air; an EGR apparatus which includes an EGR line that branches off from the exhaust line at a rear end of the turbocharger and merges into the intake line, and an EGR cooler that is disposed in the EGR line so as to cool exhaust gas flowing through the EGR line; a waste gate valve which is installed in an exhaust bypass line, which branches off from a front end of the turbine and merges into a rear end of the turbine, and adjusts the amount of exhaust gas flowing into the turbine; and a recirculation valve which is installed in an intake bypass line, which branches off the intake line at a front end of the engine and merges into the intake line at a front end of the compressor, and supplies a part of the intake gas, which is compressed by the turbocharger, into the intake line at the front end of the compressor.

The engine system may further include a controller which controls operations of the turbocharger, the waste gate valve, the EGR valve, and the recirculation valve, in which the controller adjusts an opening degree of the waste gate valve, the recirculation valve, and the EGR valve based on an operation region in which the turbocharger operates.

In the operation region in which the turbocharger does not operate, the controller may not fully open the waste gate valve but may open the waste gate valve to the extent that no boost pressure is generated by the turbocharger such that an opening degree of the waste gate valve is equal to or higher than a preset value, and the controller may adjust an EGR ratio of intake gas, which is supplied to the combustion chamber through the intake line, by adjusting opening degrees of the EGR valve and the recirculation valve.

In the operation region in which the turbocharger operates, the controller may control an opening degree of the waste gate valve based on desired boost pressure, may control the recirculation valve to be closed and may adjust an EGR ratio by adjusting an opening degree of the EGR valve.

Another exemplary embodiment of the present disclosure provides a method of controlling an engine system having an exhaust gas recirculation apparatus including an engine, an EGR apparatus, and a turbocharger, the method including: detecting, by an operation information detection unit, required torque and required speed for the engine; determining, by a controller, an operation region in which the turbocharger operates, based on the required torque and the required speed; and adjusting, by the controller, an opening degree of a waste gate valve that adjusts the amount of exhaust gas flowing into a turbine of the turbocharger, and an opening degree of a recirculation valve installed in an intake bypass line that branches off from an intake line at a front end of the engine and merges into the intake line at a front end of a compressor of the turbocharger, based on the operation region in which the turbocharger operates.

In the operation region in which the turbocharger does not operate, the waste gate valve may not be fully opened but may be opened to the extent that no boost pressure is generated by the turbocharger such that an opening degree of the waste gate valve is equal to or higher than a preset value, and an EGR ratio of intake gas, which is supplied into the combustion chamber through the intake line, may be adjusted by adjusting opening degrees of the EGR valve and the recirculation valve.

In the operation region in which the turbocharger operates, an opening degree of the waste gate valve may be adjusted based on desired boost pressure, closing the recirculation valve, and an EGR ratio may be adjusted by adjusting an opening degree of the EGR valve.

According to the engine system having an exhaust gas recirculation apparatus according to the exemplary embodiment of the present disclosure and the method of controlling the same, in the operation region in which the turbocharger does not operate, a part of outside air and recirculation gas is recirculated into the intake line through the intake bypass line and the recirculation valve, and as a result, it is possible to increase an EGR ratio of the intake gas.

BRIEF DESCRIPTION OF THE DRAWINGS

The drawings are intended to be used as references for describing the exemplary embodiments of the present disclosure, and the accompanying drawings should not be construed as limiting the technical spirit of the present disclosure.

DETAILED DESCRIPTION

Figure 1:
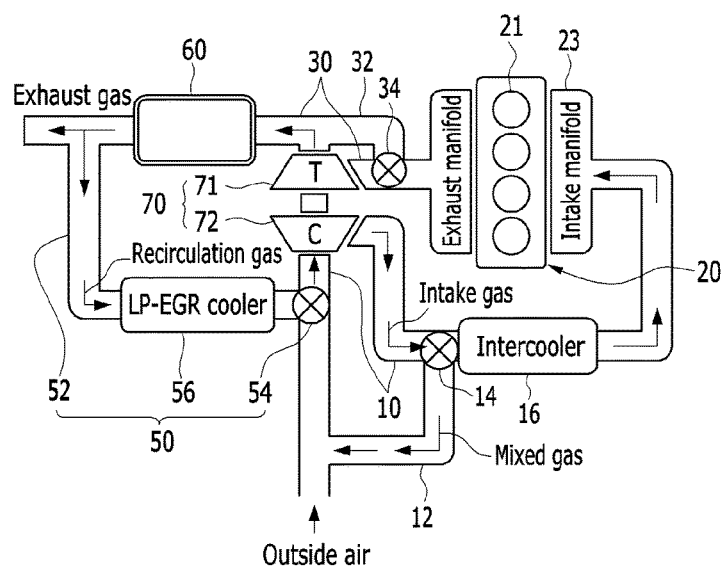
FIG. 1 is a conceptual view illustrating a configuration of an engine system having an exhaust gas recirculation apparatus according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

A part irrelevant to the description will be omitted to clearly describe the present disclosure, and the same or similar constituent elements will be designated by the same reference numerals throughout the specification.

In addition, the size and thickness of each component illustrated in the drawings may be arbitrarily shown for understanding and ease of description, but the present disclosure is not limited thereto. Thicknesses of several portions and regions may be enlarged for clear expressions.

Hereinafter, an engine system having an exhaust gas recirculation apparatus according to an exemplary embodiment of the present disclosure will be described in detail with reference to the accompanying drawings.

Figure 2:
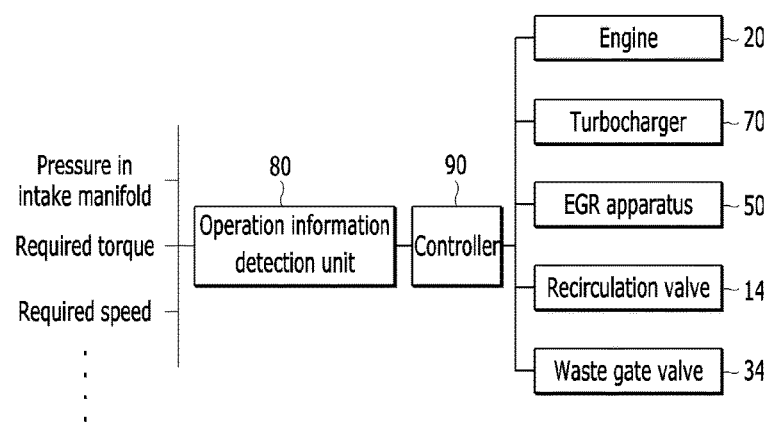
FIG. 2 is a block diagram illustrating a configuration of an engine system having an exhaust gas recirculation apparatus according to an exemplary embodiment of the present disclosure.

FIG. 1 is a conceptual view illustrating a configuration of an engine system having an exhaust gas recirculation apparatus according to an exemplary embodiment of the present disclosure. FIG. 2 is a block diagram illustrating a configuration of an engine system having an exhaust gas recirculation apparatus according to an exemplary embodiment of the present disclosure.

As illustrated in FIGS. 1 and 2, an engine system having an exhaust gas recirculation apparatus (hereinafter, referred to as an 'engine system') according to an exemplary embodiment of the present disclosure may include an engine 20, a turbocharger 70, an intercooler 16, a low pressure exhaust gas recirculation (LP-EGR) apparatus 50, an operation information detection unit 80 and a controller 90.

The engine 20 may include a plurality of combustion chambers 21 that generates driving power by combusting a fuel. The engine 20 is provided with an intake line 10 through which intake gas to be supplied to the combustion chamber 21 flows, and an exhaust line 30 through which exhaust gas discharged from the combustion chamber 21 flows.

An exhaust gas purification apparatus 60, which removes various types of substances included in exhaust gas discharged from the combustion chamber 21, is provided in the exhaust line 30. To remove nitrogen oxide, the exhaust gas purification apparatus 60 may include a lean NOx trap (LNT), a diesel oxidation catalyst and a diesel particulate filter.

The turbocharger 70 compresses intake gas (outside air and recirculation gas), which inflows through the intake line 10 and supplies the intake gas to the combustion chamber 21. The turbocharger 70 includes a turbine 71 provided in the exhaust line 30 and rotates by exhaust gas discharged from the combustion chamber 21, and a compressor 72 which rotates in conjunction with the rotation of the turbine 71 and compresses intake gas.

The LP-EGR apparatus 50 may include a low pressure EGR line 52, a low pressure EGR cooler 56, and a low pressure EGR valve 54. While the LP-EGR apparatus is described as an example in the exemplary embodiment of the present disclosure, other types of EGR apparatuses (e.g., a high-pressure EGR apparatus) may be applied.

The low pressure EGR line 52 branches off from the exhaust line 30 at a rear end of the turbocharger 70 and merges into the intake line 10. The low pressure EGR cooler 56 is disposed in the low pressure EGR line 52, and cools exhaust gas that flows through the low pressure EGR line 52. The low pressure EGR valve 54 is positioned at a point at which the low pressure EGR line 52 and the intake line 10 merge together, and adjusts the amount of exhaust gas that flows into the intake line 10. Here, the exhaust gas, which is supplied into the intake line 10 through the low pressure EGR line 52, is referred to as recirculation gas.

The intercooler 16 cools intake gas, which inflows through the intake line 10, through a heat exchange with a coolant. As the intake gas compressed by the turbocharger 70 expands as a temperature thereof increases, an oxygen density of the intake gas supplied into the combustion chamber 21 decreases. Thus, it is difficult to output torque required for the engine 20. Therefore, the density of the intake gas is increased by ooling the intake gas by means of the intercooler 16, thereby improving a combustion efficiency of the engine 20.

Meanwhile, an exhaust bypass line 32, which branches off from the exhaust line 30 at a front end of the turbine 71 and merges into the exhaust line 30 at a rear end of the turbine 71, is formed, and a waste gate valve 34 is installed in the exhaust bypass line 32. The waste gate valve 34 operates based on a control signal of the controller 90, and the amount of exhaust gas supplied into the turbine 71 is adjusted based on an opening degree of the waste gate valve 34.

An intake bypass line 12, which branches off from the intake line 10 at a front end of the engine 20 and merges into the intake line 10 at a front end of the compressor 72, is formed, and a recirculation valve 14 is installed in the intake bypass line 12. The recirculation valve 14 operates based on a control signal of the controller 90, and an exhaust gas recirculation (EGR) ratio, which is supplied to the combustion chamber 21 through the compressor 72, is adjusted based on an opening degree of the recirculation valve 14. The EGR ratio means a ratio of recirculation gas with respect to outside air.

The controller 90 controls operations of the engine 20, the turbocharger 70, the waste gate valve 34, the EGR valve 54, and the recirculation valve 14.

The controller 90 may be configured by one or more processors which are operated by a preset program, and the preset program is configured to perform respective steps of an engine control method according to an exemplary embodiment of the present disclosure.

Based on required torque and speed for a driver, which are detected by the operation information detection unit 80, the controller 90 determines an operation region in which the turbocharger 70 operates, and the controller 90 adjusts an opening degree of the recirculation valve 14 based on the operation region of the turbocharger 70.

The operation information detection unit 80 measures the required torque and the required speed for a driver, and transmits the measured required torque and the measured required speed to the controller 90. The required torque and the required speed for the driver may be detected by an acceleration pedal sensor (APS) provided in the vehicle.

Based on the required torque and the required speed detected by the operation information detection unit 80, the controller 90 determines the operation region in which the turbocharger 70 operates. For example, the operation region in which the turbocharger 70 operates may be a high-speed and high-load region, and a region in which the turbocharger 70 does not operate may be a relatively low-speed and low-load region.

Alternatively, the operation region in which the turbocharger 70 operates may be a region in which a differential pressure between the front and rear ends of the EGR valve is equal to or higher than a preset pressure, or a preset amount.

Figure 3:
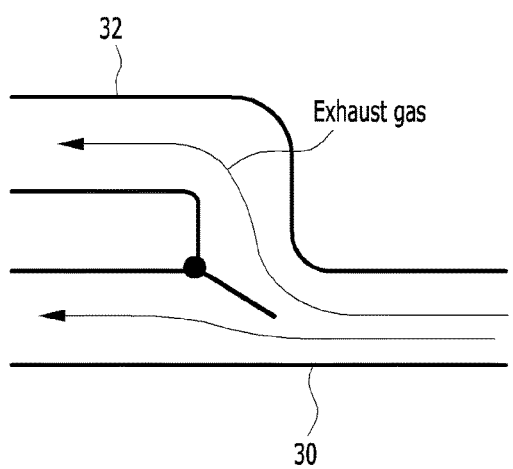
FIGS. 3 to 5 are views illustrating a flow of exhaust gas according to exemplary embodiments of the present disclosure.

In the operation region in which the turbocharger 70 operates, the controller 90 shuts off the recirculation valve 14, and prevents mixed gas from flowing into the intake bypass line 12. Further, based on a desired boost pressure, the controller 90 controls the waste gate valve 34 (see FIG. 3), and rotates the turbine 71 and the compressor 72 in order to compress intake gas (outside air+recirculation gas) flowing through the intake line 10 and supply the intake gas to the combustion chamber 21. In this case, the ratio (EGR ratio) of the recirculation gas included in the intake gas supplied into the combustion chamber 21 is adjusted based on an opening degree of the EGR valve 54.

However, in the operation region in which the turbocharger 70 does not operate, the controller 90 increases an opening degree of the waste gate valve 34 to a preset degree or higher, and adjusts opening degrees of the EGR valve 54 and the recirculation valve 14, thereby adjusting an EGR ratio of the intake gas supplied into the combustion chamber 21 through the intake line 10.

Figure 4:
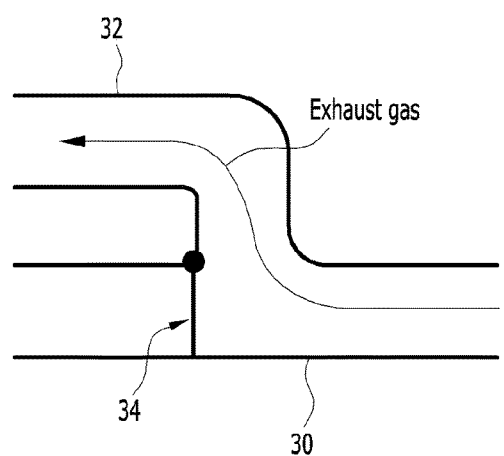

In general, in the operation region in which the turbocharger 70 does not operate, the waste gate valve 34 is controlled to be fully opened (see FIG. 4), such that exhaust gas is discharged to the outside through the exhaust bypass line 32 without passing through the turbine 71.

However, in a case in which the waste gate valve 34 is fully opened in the operation region in which the turbocharger 70 does not operate, the turbine 71 provided in the exhaust line 30 does not rotate, and as a result, the compressor 72 provided in the intake line 10 does not rotate.

Figure 5:
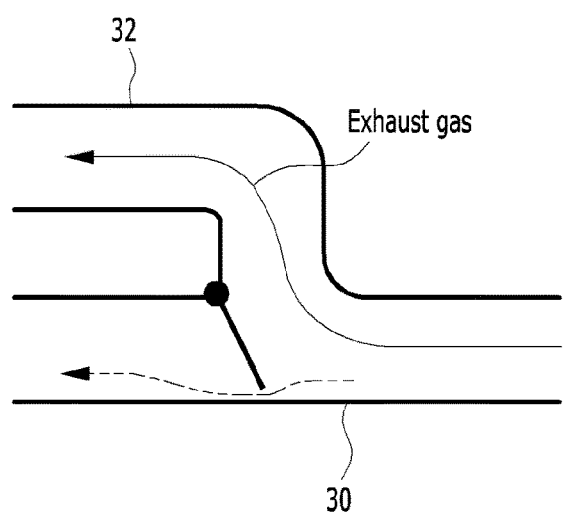

Therefore, the controller 90 does not fully open the waste gate valve 34, but opens the waste gate valve 34 to a preset degree or higher to the extent that no boost pressure is generated by the turbocharger 70 (see FIG. 5). In this case, a tiny amount of exhaust gas flows into the exhaust line 30. Therefore, the turbine 71 and the compressor 72 rotate minutely, and as a result, a flow rate of the intake gas flowing through the intake line 10 is increased.

Further, by opening the recirculation valve 14, a part of the intake gas flowing through the intake line 10 is recirculated to the front end of the compressor 72 through the intake bypass line 12. Here, for ease of description, the gas, which is recirculated to the intake line 10 at the front end of the compressor 72 through the intake bypass line 12, is referred to as mixed gas.

When the recirculation valve 14 is opened, the outside air, the recirculation gas, and the mixed gas flow through the intake line 10. In this case, since the mixed gas contains the outside air and the recirculation gas, an EGR ratio of the intake gas flowing through the intake line 10 is increased.

The recirculation valve 14 may be opened when pressure of the intake gas in an intake manifold 23 is equal to or higher than a preset pressure. When pressure in the intake manifold 23 is higher than the preset pressure, the recirculation valve 14 is opened, and pressure of the intake gas in the intake manifold 23 is appropriately adjusted, thereby preventing a surge of the engine 20.

Hereinafter, an operation of the engine system according to an exemplary embodiment of the present disclosure will be described in detail with reference to the accompanying drawings.

Figure 6:
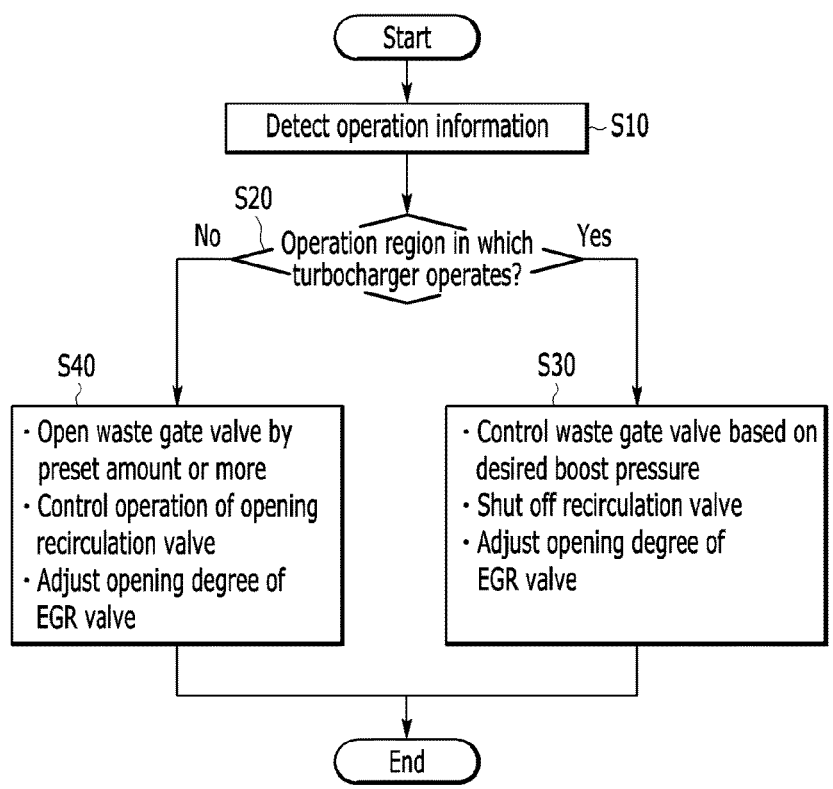
FIG. 6 is a flowchart illustrating a method of controlling an engine system having an exhaust gas recirculation apparatus according to an exemplary embodiment of the present disclosure.

FIG. 6 is a flowchart illustrating a method of controlling an engine system having an exhaust gas recirculation apparatus according to an exemplary embodiment of the present disclosure.

As illustrated in FIG. 6, the operation information detection unit 80 detects the required torque and the required speed for the engine 20, and transmits the detected required torque and the detected required speed to the controller 90 (S10).

Based on the required torque and the required speed, the controller 90 determines the operation region in which the turbocharger 70 operates (S20).

Based on the operation region in which the turbocharger 70 operates, the controller 90 adjusts an opening degree of the waste gate valve 34 and an opening degree of the recirculation valve 14.

Specifically, in the operation region in which the turbocharger 70 operates, the controller 90 increases an opening degree of the waste gate valve 34 based on the desired boost pressure, and shuts off the recirculation valve 14 (S30).

Since the waste gate valve 34 is opened based on the desired boost pressure, the turbine 71 and the compressor 72 rotate such that the intake gas flowing through the intake line 10 is compressed by the compressor 72 and the compressed intake gas is supplied into the combustion chamber 21.

In this case, the ratio (EGR ratio) of the recirculation gas supplied into the combustion chamber 21 is adjusted based on an opening degree of the EGR valve 54.

However, in the operation region in which the turbocharger 70 does not operate, the controller 90 does not fully open the waste gate valve 34 but opens the waste gate valve 34 so that an opening degree of the waste gate valve 34 is equal to or higher than the preset degree, and opens the recirculation valve 14. In this case, an opening degree of the recirculation valve 14 may be adjusted based on a pressure in the intake manifold 23 (S40).

When the recirculation valve 14 is opened, a part (mixed gas) of the intake gas (outside air+recirculation gas) is supplied into the intake line 10 at the front end of the compressor 72 through the intake bypass line 12, the recirculation gas is supplied into the intake line 10 based on an opening degree of the EGR valve 54, and the outside air is also supplied into the intake line 10.

That is, the outside air, the recirculation gas, and the mixed gas flow through the intake line 10. In this case, the mixed gas contains the recirculation gas, and the intake gas flowing through the intake line 10 contains the recirculation gas and the mixed gas. As a result, assuming that an opening degree of the EGR valve 54 is constant, the EGR ratio of the intake gas flowing through the intake line 10 is increased.

As described above, in the operation region in which the turbocharger 70 does not operate, the recirculation valve 14 is opened, and the mixed gas is supplied into the intake line 10. As a result, it is possible to increase the EGR ratio of the intake gas supplied into the combustion chamber 21 through the intake line 10.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An engine system having an exhaust gas recirculation apparatus, the engine system comprising:

an engine including a plurality of combustion chambers that generates a driving power by combusting fuel;

an intake line into which intake gas to be supplied into the combustion chamber flows;

an exhaust line through which exhaust gas discharged from the combustion chamber flows;

a turbocharger including a turbine provided in the exhaust line and rotated by exhaust gas discharged from the combustion chamber, and a compressor provided in the intake line and rotated in conjunction with the rotation of the turbine and compressing outside air;

an EGR apparatus including an EGR line that branches off from the exhaust line at a rear end of the turbocharger and merges into the intake line, and an EGR cooler disposed in the EGR line for cooling exhaust gas flowing through the EGR line;

a waste gate valve installed in an exhaust bypass line, which branches off from a front end of the turbine and merges into a rear end of the turbine, and adjusts an amount of exhaust gas flowing into the turbine;

a recirculation valve installed in an intake bypass line, which branches off the intake line at a front end of the engine and merges into the intake line at a front end of the compressor, and supplies a part of the intake gas, which is compressed by the turbocharger, into the intake line at the front end of the compressor, and a controller which controls operations of the turbocharger, the waste gate valve, the EGR valve and the recirculation valve, wherein the controller adjusts an opening degree of the waste gate valve, the recirculation valve and the EGR valve based on an operation region in which the turbocharger operates, wherein in the operation region in which the turbocharger does not operate, the controller does not fully open the waste gate valve but opens the waste gate valve to the extent that no boost pressure is generated by the turbocharger such that an opening degree of the waste gate valve is equal to or higher than a preset value, and the controller adjusts an EGR ratio of intake gas, which is supplied into the combustion chamber through the intake line, by adjusting opening degrees of the EGR valve and the recirculation valve, and wherein in the operation region in which the turbocharger operates, the controller controls an opening degree of the waste gate valve based on a desired boost pressure, controls the recirculation valve to be closed and adjusts an EGR ratio by adjusting an opening degree of the EGR valve.

2. A method of controlling an engine system having an exhaust gas recirculation apparatus including an engine, an EGR apparatus and a turbocharger, the method comprising:

detecting, by an operation information detection unit, a required torque and a required speed for the engine;

determining, by a controller, an operation region in which the turbocharger operates, based on the required torque and the required speed;

adjusting, by the controller, an opening degree of a waste gate valve that adjusts the amount of exhaust gas flowing into a turbine of the turbocharger, and an opening degree of a recirculation valve installed in an intake bypass line that branches off from an intake line at a front end of the engine and merges into the intake line at a front end of a compressor of the turbocharger, based on the operation region in which the turbocharger operates, in the operation region in which the turbocharger does not operate, opening the waste gate valve to the extent that no boost pressure is generated by the turbocharger such that an opening degree of the waste gate valve is equal to or higher than a preset value without fully opening the waste gate valve, and adjusting an EGR ratio of intake gas, which is supplied into the combustion chamber through the intake line, by adjusting opening degrees of the EGR valve and the recirculation valve, and in the operation region in which the turbocharger operates, adjusting an opening degree of the waste gate valve based on desired boost pressure, closing the recirculation valve, and adjusting an EGR ratio by adjusting an opening degree of the EGR valve.

* * * * *